June 21, 1960   W. J. BARTHOLOMÄUS   2,941,853
THRUST BEARING

Filed April 22, 1955   2 Sheets-Sheet 1

INVENTOR
WERNER J. BARTHOLOMÄUS

BY Dicke and Craig.
ATTORNEYS.

June 21, 1960 W. J. BARTHOLOMÄUS 2,941,853
THRUST BEARING

Filed April 22, 1955 2 Sheets-Sheet 2

INVENTOR
WERNER J. BARTHOLOMÄUS
BY *Dicke and Craig*
ATTORNEYS.

United States Patent Office 2,941,853
Patented June 21, 1960

2,941,853

THRUST BEARING

Werner J. Bartholomäus, Stuttgart, Germany, assignor to Daimler-Benz Aktiengesellschaft, Stuttgart-Unterturkheim, Germany Filed Apr. 22, 1955, Ser. No. 503,129

8 Claims. (Cl. 308—233)

The present invention relates to new improvements in thrust bearings, primarily for use in hydrostatic gears.

It is an object of the present invention to provide a new thrust bearing of relatively small dimensions which, however, is capable of taking up an axial thrust of considerable force.

A further object of the present invention is to provide a thrust bearing with a plurality of individual bearing elements each of which is designed to take up a part of the thrust exerted upon the entire bearing, and thus to distribute the thrust as uniformly as possible upon such individual bearing elements.

An essential feature of the present invention consists in the provision of a plurality of thrust-supporting surfaces or elements which, in turn, are supported by a fluid pressure medium preferably of the hydraulic type. These thrust-supporting surfaces or elements preferably act in the nature of piston surfaces either upon a common pressure chamber or upon a plurality of interconnected pressure chambers.

According to further features of the invention, the thrust-supporting surfaces of the new bearing structure which are acted upon by the same pressure medium are designed in the form of annular pistons which are disposed concentrically to each other, and the supporting pistons are preferably given the same effective annular cross-sectional area.

Another feature of the invention also consists in supporting the bearing elements by separate pistons, for example, by providing three pistons for each thrust bearing in a star-shaped arrangement.

Still another feature of the present invention consists in the use of the fluid for operating the hydrostatic transmission also for acting as the pressure fluid for operating the new thrust bearing, preferably by connecting the pressure chambers of the bearing to the high-pressure system of the operating fluid of the gear transmission.

Further objects, features, and advantages of the present invention will appear from the following detailed description thereof when studied with reference to the accompanying drawings, in which:

Fig. 2 shows a similar cross section through another embodiment of the invention; while

Figure 1:
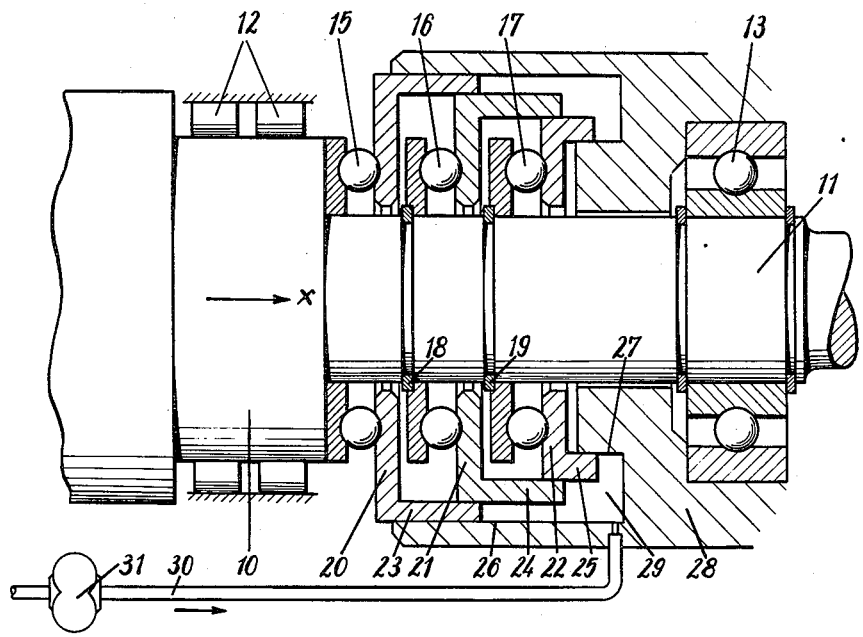
Fig. 1 shows an axial cross section through one embodiment of the invention.

Referring to the drawings, and first particularly to Fig. 1, the element 10 of a hydraulic transmission is rigidly secured to the shaft 11 and rotatably mounted in roller bearings 12 and a ball bearing 13. For taking up and supporting the axial thrust acting in the direction shown by the arrow x, thrust bearings 15, 16, and 17 are provided and arranged one behind the other in axial direction. Thus, while the ball bearing 15 takes up the axial thrust which is transmitted thereto, for example, directly by the transmission element 10, such thrust is then transmitted to the bearings 16 and 17 by means of the snap rings 18 and 19.

The bearing races 20, 21, and 22 of the thrust bearings 15, 16, and 17 are provided at their outer periphery with cylindrical annular portions 23, 24, and 25, respectively, which are concentric to each other. These annular portions 23, 24, and 25 form annular pistons which engage and slide along each other, with the outer piston 23 sliding within an outer cylindrical surface 26 and the inner piston 25 sliding along a cylindrical surface 27 of the housing 28. This housing 28 together with the annular pistons 23, 24, and 25 encloses an annular cylindrical chamber 29 which is supplied with oil under pressure through a conduit 30 from a suitable source of pressure, for example, a gear pump 31 or a pressure reservoir, so that any oil which might leak through the adjoining surfaces will be constantly replaced.

The thrust acting in the direction shown by the arrow x is thus distributed by the thrust bearings 15, 16, and 17 to the annular pistons 23, 24, and 25. If these pistons are given an equal effective annular cross-sectional area, this will insure the axial thrust to be distributed uniformly upon the thrust bearings 15, 16, and 17. The thrust will then be taken up by the pressure fluid contained in the pressure chamber 29.

Figure 2:
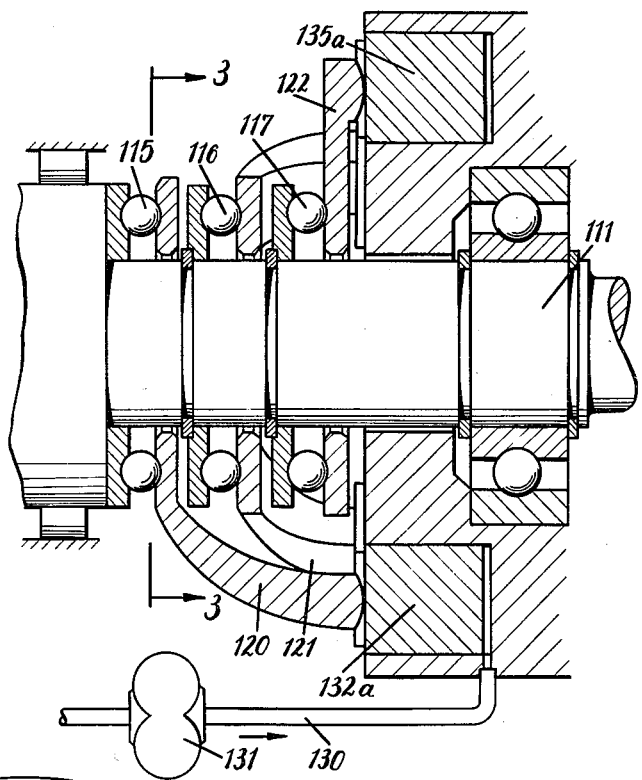
Figure 3:
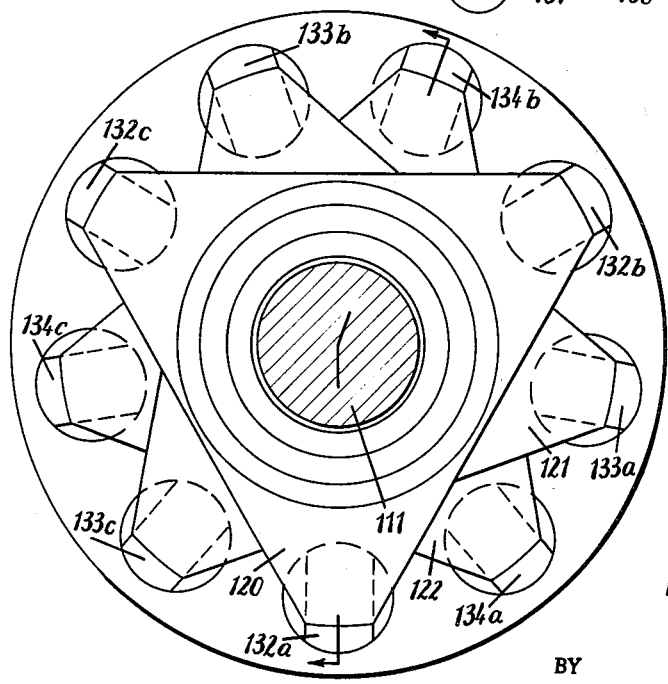
Fig. 3 shows a cross section taken along line 3—3 of Fig. 2.

In the modified embodiment of the invention shown in Figs. 2 and 3, the thrust bearings 115, 116, and 117 are provided with races 120, 121, and 122, respectively, which, as shown particularly in Fig. 3, are extended beyond the respective bearings, themselves so as to form a triangular or star-shaped arrangement, and each is individually supported by a separate piston. The race 120 which thus forms a triangular pressure plate then rests upon the pistons 132a, 132b, and 132c which are arranged in a triangular formation, while the pressure plates 121 and 122 rest upon pistons 133a, 133b, 133c, 134a, 134b, and 134c respectively. The respective cylinders of all the pistons communicate with each other and are connected to the conduit 130 of the pump 131 which also supplies fluid to the hydrostatic transmission mounted on the same shaft 111 in a manner not particularly illustrated.

While I have described my invention with reference to the preferred embodiments thereof, I wish to have it understood that the invention is in no way limited to the details of such embodiments, but is capable of numerous modifications within the scope of the appended claims. Thus, for example, the pistons and cylinders may be kinematically exchanged with one another so that the cylinders may, for example, be acting upon the rotary part by means of ball bearings, while the pistons are mounted on the stationary part. Also, the various features of the invention may either be exchanged for each other or combined with each other.

Having thus fully disclosed my invention, what I claim is:

1. A thrust bearing comprising a pressure transmitting element, a pressure receiving element, a plurality of circumferentially arranged cylinders provided in one of said elements, a piston-like member for each of said cylinders, at least two star-shaped connecting members connecting the other element with said piston-like members with the arms of said connecting members extending in different radial directions to provide a favorable spatial arrangement, and means for conducting a fluid under pressure to all of said cylinders to uniformly absorb thereby any thrust transmitted from said other element to said piston-like members by said connecting member.

2. A multiple thrust bearing having a plurality of thrust bearings, a housing provided with a plurality of circumferentially arranged cylinders, a piston-like member for each cylinder, a plurality of star-shaped pressure plate members, one star-shaped plate member being provided intermediate each one of said thrust bearings and a plurality of said piston-like members to transmit the thrust from the thrust bearing to the corresponding piston-like members, and means for applying fluid to all of said cylinders between said housing and said piston-like members to absorb thereby the thrust transmitted from said bearings to said piston-like members by said plate members, said star-shaped plate-members being so arranged that sufficient space is provided between the arms of one of said star-shaped members to enable abutment of the arms by another one of said star-shaped plate members against the piston-like members located therebetween.

3. A thrust bearing comprising a thrust transmitting element adapted to rotate about its axis, a thrust receiving element coaxial with said first element, a plurality of cylinders operatively connected with one of said elements, a plurality of pistons adapted to slide in said cylinders, respectively, and operatively connected with the other of said elements, said cylinders and pistons together forming pressure chambers closed toward the outside and adapted to receive a fluid pressure medium, a first pressure member, said pistons including at least two groups of pistons, said pressure member supporting the first group of said pistons against the pressure of said medium, a second pressure member supporting the second group of said pistons against the pressure of said pressure medium, and means for supporting said pressure members on the element operatively connected with said pistons.

4. A thrust bearing as defined in claim 3, wherein said pressure chambers are supplied with said fluid pressure medium from a common pressure supply system.

5. A thrust bearing as defined in claim 3, wherein said last means comprise a plurality of thrust bearings.

6. A thrust bearing as defined in claim 3, wherein each pressure member is operatively connected with three pistons, said pistons being uniformly distributed relative to said axis and peripherally thereof.

7. A thrust bearing as defined in claim 3, in combination with at least one further pressure member, said pistons also comprising a further group of pistons, said further pressure member supporting said further group of pistons against the pressure of said pressure medium, said groups being distributed relative to said axis so that the pistons of different groups alternate with each other peripherally of said axis.

8. A thrust bearing as defined in claim 3, wherein said pressure members consist of pressure plates, said plates being axially displaced relative to each other and arranged on the element operatively connected with said pistons, at least a part of said plates having projections for supporting the same on the respective pistons.

References Cited in the file of this patent

UNITED STATES PATENTS

| | | |
|---|---|---|
| 1,421,208 | Gauldie | June 27, 1922 |
| 1,510,814 | Wintroath et al. | Oct. 7, 1924 |

FOREIGN PATENTS

| | | |
|---|---|---|
| 517,418 | Great Britain | Jan. 30, 1940 |